Oct. 9, 1951     T. E. PARRISH     2,570,372
AUTOMATIC SHUTOFF VALVE
Filed Dec. 7, 1946     2 Sheets-Sheet 2
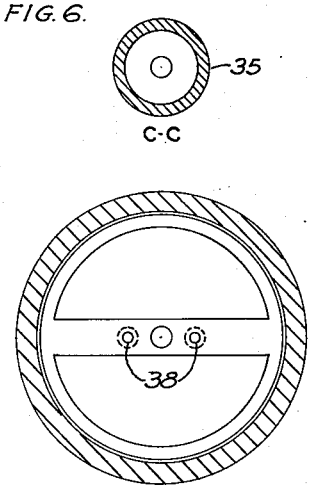
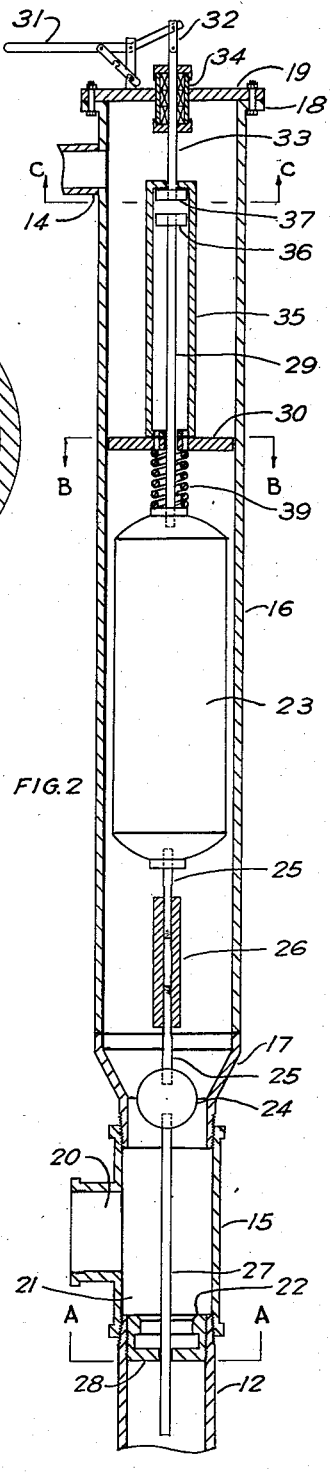
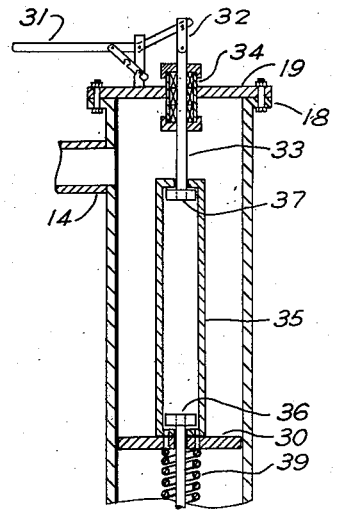
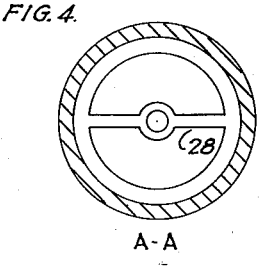
INVENTOR.
Tom E. Parrish
BY
Attorney

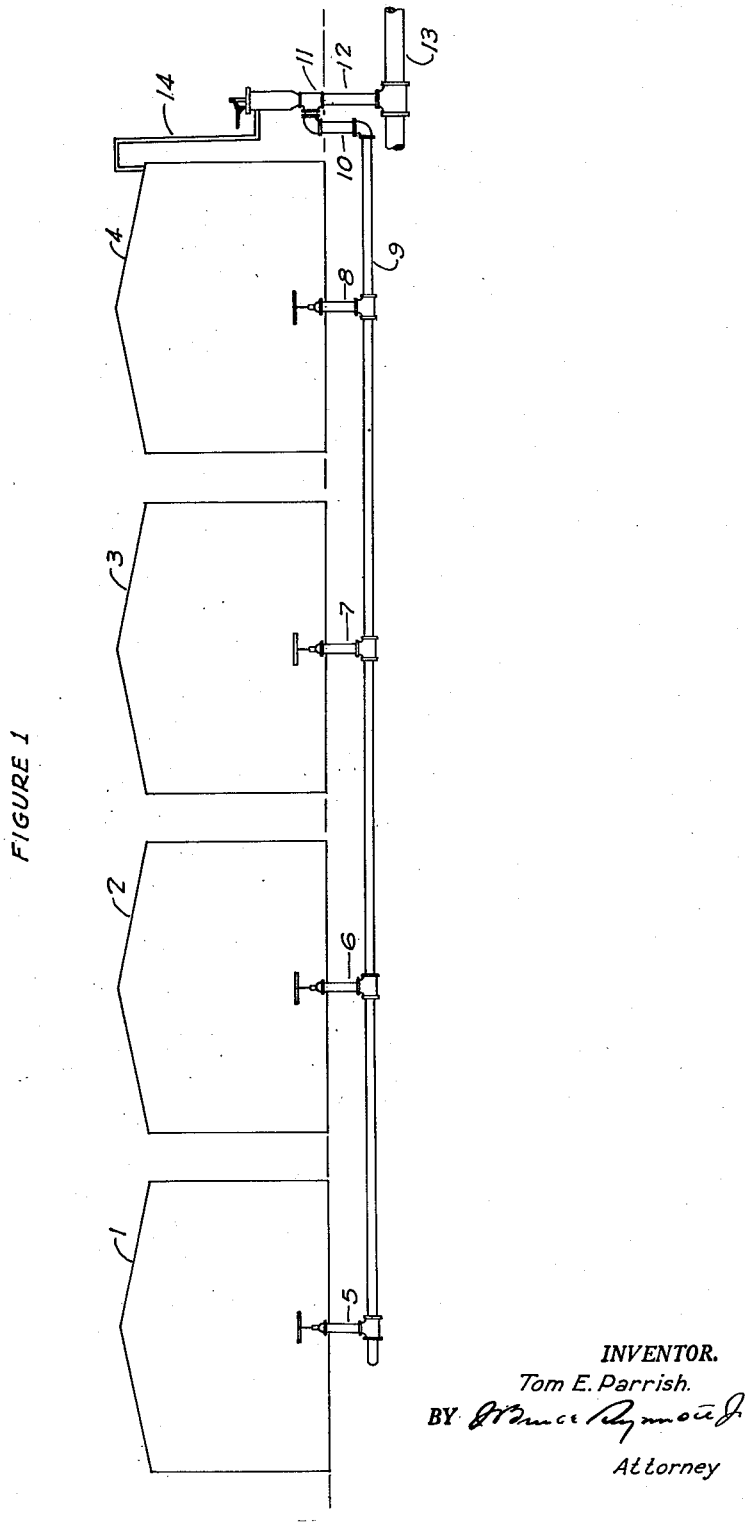

Patented Oct. 9, 1951

2,570,372

UNITED STATES PATENT OFFICE 2,570,372

AUTOMATIC SHUTOFF VALVE

Tom E. Parrish, Beaumont, Tex.

Application December 7, 1946, Serial No. 714,819

3 Claims. (Cl. 137—68)

The invention concerns an automatic shutoff valve for use in connection with a battery of one or more tanks such as those commonly used in oil pipe line gathering systems. It is common practice to pump oil from two or more of such tanks at the same time, the draw-off lines from the several tanks being served by a common pipe line. Ordinarily the liquid level in the several tanks of the battery becomes equalized during pumping. A pipe line may be fed by a number of such batteries of tanks, taking suction on all of them at the same time. The shutoff valve of this invention may be used to shut off the flow of oil from a given tank or battery when the liquid level therein has dropped below a certain point, such, for example, as the point where the draw-off line enters the tank. At the same time the connection between the draw-off line and the pipe line is positively closed so that no air is admitted to the pipe line from the tank.

A number of devices intended to be used for the purpose described are now on the market, and others are disclosed in previously issued patents, but none of them are entirely satisfactory.

It is an object of the invention to provide a shutoff valve which is adapted to shut off the flow of liquid from a tank without permitting any air whatsoever to enter the pipe line from the tank. The presence of air in a pipe line destroys the suction and thus interferes with the pumping operation.

The automatic shutoff valve of the invention is adapted for use in a system in which the draw-off lines of a battery of tanks are connected to a common header which may be buried below the surface of the ground, below the bottom level of the tanks, the inlet of the shutoff valve being connected to a riser leading from the common header and the discharge opening of the shutoff valve being connected to the pipe line.

As described more fully hereinafter, the shutoff valve includes a vertically disposed tubular casing having a side inlet near the bottom thereof, a bottom discharge opening below the side inlet and a float chamber positioned substantially in its entirety above the side inlet, a circular valve seat in the discharge opening, a float bodily receivable in the float chamber, a valve adapted to close the opening surrounded by the valve seat, and a valve stem connecting the valve to the bottom of the float. The arrangement is such that in operation the valve will be seated while the liquid level in the casing remains substantially above the side inlet.

It is contemplated that the shutoff valve will be installed with the float chamber at about the same elevation as the discharge openings in the tanks, so that when the valve is closed the tanks will be substantially empty. But since the float chamber is at a somewhat higher elevation than the remainder of the valve, the valve will close while the draw-off lines, the common header, the riser and the valve casing remain at least partly filled with oil and the inlet of the valve is entirely submerged. Thus a liquid seal is formed which positively prevents any air entering the pipe line from the tanks.

The arrangement above described represents a substantial departure from devices previously used for this purpose, in which the connection between the tank and the pipe line is not broken until after the flow of liquid thru the shutoff valve has stopped, and which permit at least some air to enter the pipe line.

Another object of the invention is to provide a float controlled shutoff valve which is so designed that the float will rise and fall freely in response to fluctuations in liquid level and the valve will be properly seated.

It is a further object of the invention to provide a shutoff valve having a vacuum-free float chamber. The shutoff valve of the invention has a vent line extending upwardly from a point near the top of the float chamber. The vent line eliminates vacuum in the float chamber, permitting the float to rise and fall freely in response to fluctuations in liquid level, and the valve will be properly seated.

A further object of the invention is to provide a float controlled shutoff valve having mechanical lifting means adapted to positively lift the valve from its seat, for use when the valve becomes stuck, or the buoyancy of the float alone is not sufficient to unseat the valve against the suction created by the flow of oil thru the pipe line, or when it is desired to hold the valve open while oil is being evacuated from the lines leading from the tanks to the gathering station, as when repairs are being made or new connections tied in, or while air or gas is being evacuated from the pipe line thru a vent line extending upwardly from a point near the top of the shutoff valve. Any air or gases that may be traveling thru lines during pumping operations will seek the highest and first point of escape and will escape thru the float chamber and out thru the vent line without disturbing the operation of the valve.

Other advantageous features of the invention will be apparent from the following description and the accompanying drawing, in which:

Figure 1 is a diagrammatic view in elevation showing a battery of tanks having their draw-off lines connected to a common header, with the automatic shutoff valve of the invention interposed between the header and the pipe line.

Figure 2 is a sectional view in elevation of the shutoff valve, showing the valve in open position.

Figure 3 is a sectional view in elevation of the shutoff valve, showing the valve in closed position.

Figure 4 is an enlarged sectional view taken on the line A—A of Figure 2.

Figure 5 is an enlarged sectional view taken on the line B—B of Figure 2.

Figure 6 is an enlarged sectional view taken on the line C—C of Figure 2.

Referring to the drawing, the numerals 1, 2, 3 and 4 indicate a plurality of tanks which are connected thru valved draw-off lines 5, 6, 7 and 8 to a common header 9. The tanks 1, 2, 3 and 4 are situated above the ground, while the header 9 is buried below the surface. A riser 10 connects the header 9 with the shutoff valve of the invention, which is indicated generally as at 11. The shutoff valve 11 is connected by a discharge pipe 12 to a pipe line 13. A vent line 14 extends upwardly from the shutoff valve 11 and communicates with the top of the tank 4. The tank 4 in turn is vented to the atmosphere. Optionally the line 14 may be vented directly to the atmosphere.

The shutoff valve 11 comprises a tubular casing which is formed by a T 15 and a length of pipe 16. The pipe 16 preferably is of somewhat larger diameter than the T 15, and is joined to the upper end of T 15 by a swaged nipple 17. The upper end of the pipe 16 is flanged at 18 to receive a blind flange 19, and the flanges 18 and 19 are bolted together to close the end of the pipe 16.

One of the openings in the T 15 forms a side inlet 20, which is connected to the riser 10. The lower end of T 15 forms a bottom discharge opening 21, which is connected to the discharge pipe 12. A circular valve seat 22 is provided in the discharge opening 21.

The vent line 14 extends upwardly from a point near the top of the casing.

The pipe 16 and the swaged nipple 17, which together constitute the upper part of the valve casing, form a float chamber which is positioned substantially in its entirety above the level of the side inlet 20. The float chamber is adapted to receive bodily a cylindrical float 23. A ball valve 24, adapted to close the opening surrounded by the valve seat 22, is connected by an adjustable valve stem 25 to the bottom of the float 23. The valve stem 25 includes a turnbuckle 26 which permits the length of the valve stem 25 to be adjusted to compensate for differences in gravity of the liquid being handled.

A guide rod 27 extends downwardly from the valve 24. The valve seat 22, as shown, is formed integrally with a spider 28, which is positioned below the valve seat 22. The guide rod 27 passes thru the opening surrounded by the valve seat 22 and thru a central opening in the spider 28.

A guide rod 29 extends upwardly from the top of the float 23 and passes thru a central opening in a spider 30. The spiders 28 and 30 serve as guides for the guide rods 27 and 29, and tend to maintain them in vertical alignment.

A lever 31 is mounted on the top side of the blind flange 19 and is connected by a link 32 with a rod 33. The rod 33 extends downwardly thru a stuffing box 34 which in turn projects thru the center of the blind flange 19. The guide rod 29 and the rod 33 extend thru central openings in opposite ends of a sleeve-like member 35 and are provided at their ends with enlarged portions 36 and 37 which prevent the rods 29 and 33 from being pulled thru the ends of the sleeve-like member 35. The arrangement is such that the float 23 may be raised, and the valve 24 lifted from its seat, by manipulating the lever 31, which in turn acts upon the rod 33 and the guide rod 29. As the float 23 rises and falls in the float chamber the guide rod 29 passes freely thru the sleeve-like member 35, the rod 33 and the sleeve-like member 35 remaining stationary when the valve lifting mechanism is not in use.

The diameter of the spider 30 approaches that of the pipe 16. The spider 30 is secured to the lower end of the sleeve-like member 35 by fastenings 38, is movable vertically therewith, and tends to maintain it in vertical alignment.

A coil spring 39 surrounds the guide rod 29, below the spider 30, and serves to absorb any shock which would otherwise occur when the float 23 strikes the spider 30 during its upward movement. The spider 30 limits the upward movement of the float 23.

In operation the valve 24 will be seated while the liquid level in the valve casing remains substantially above the side inlet 20, the latter being completely submerged.

It is contemplated that the shutoff valve will be installed with the float chamber at about the same elevation as the discharge openings in the tanks 1, 2, 3 and 4, so that when the valve 24 is seated the tanks 1, 2, 3 and 4 will be substantially empty. But since the float chamber is at a somewhat higher elevation than the side inlet 20, the valve 24 will seat while the draw-off lines 5, 6, 7 and 8, the common header 9, the riser 10 and the valve casing remain at least partly filled with liquid and the side inlet 20 is entirely submerged. Thus a liquid seal is formed which positively prevents any air entering the pipe line 13 from the tanks 1, 2, 3 and 4. The liquid seal also prevents air from being drawn into the pipe line 13 from the vent line 14.

The shutoff valve as described herein may be modified in various ways without departing from the spirit and scope of the invention.

I claim:

1. An automatic shutoff device for liquid conducting lines comprising a vertically disposed tubular casing having a side inlet near the bottom thereof, a bottom discharge opening below the side inlet and a float chamber positioned substantially in its entirety above the side inlet, a circular valve seat in the discharge opening, a float bodily receivable in the float chamber, a valve adapted to close the opening surrounded by the valve seat, a valve stem connecting the valve to the bottom of the float, a vent line extending upwardly from a point near the top of the casing, a guide rod extending downwardly from the valve thru the opening surrounded by the valve seat, a guide positioned below the valve seat adapted to engage the guide rod, a second guide rod extending upwardly from the float, a lever mounted on the top of the casing, a rod extending thru the top of the casing and connected thru linkage to one end of the lever, a sleeve-like member having one end secured to the lower end of the last mentioned rod and the other end surrounding the second guide rod, the sleeve-like member being adapted when actuated by the lever to engage the upper end of the second guide rod and lift it, and a guide secured to the lower end of the sleeve-like member adapted to engage the second guide rod as well as the walls of the casing.

2. An automatic shutoff device for liquid conducting lines comprising a vertically disposed tubular casing having a side inlet, a bottom discharge opening and a float chamber extending upwardly above the side inlet, a valve seat in the discharge opening, a float bodily receivable in the float chamber, a valve adapted to close the opening surrounded by the valve seat, a valve stem connecting the valve to the float, a vent communicating with the upper portion of the casing, a guide rod extending upwardly from the float, a lever mounted on the top of the casing, a rod extending thru the top of the casing and connected to the lever, a sleeve-like member having one end secured to the lower end of the last mentioned rod and the other end surrounding the guide rod, the sleeve-like member being adapted when actuated by the lever to engage the upper end of the guide rod and lift it, and a guide secured to the lower end of the sleeve-like member adapted to engage the guide rod as well as the walls of the casing.

3. An automatic shutoff device for liquid conducting lines comprising a vertically disposed tubular casing having a side inlet, a bottom discharge opening and a float chamber extending upwardly above the side inlet, a valve seat in the discharge opening, a float bodily receivable in the float chamber, a valve adapted to close the opening surrounded by the valve seat, a valve stem connecting the valve to the float, a vent communicating with the upper portion of the casing, a guide rod extending downwardly from the valve thru the opening surrounded by the valve seat, a guide positioned below the valve seat adapted to engage the guide rod, a second guide rod extending upwardly from the float, a lever mounted on the top of the casing, a rod extending thru the top of the casing and connected to the lever, a sleeve-like member having one end secured to the lower end of the last mentioned rod and the other end surrounding the second guide rod, the sleeve-like member being adapted when actuated by the lever to engage the upper end of the second guide rod and lift it, and a guide secured to the lower end of the sleeve-like member adapted to engage the second guide rod as well as the walls of the casing.

TOM E. PARRISH.

REFERENCES CITED

The following references are of record in the file of this patent:

UNITED STATES PATENTS

| Number | Name | Date |
| --- | --- | --- |
| 947,801 | Cooper | Feb. 1, 1910 |
| 1,098,669 | Lear | June 2, 1914 |
| 1,548,298 | Woodard | Aug. 4, 1925 |
| 1,556,760 | Conrader | Oct. 13, 1925 |
| 1,588,712 | Duck | June 15, 1926 |
| 1,626,504 | Browne | Apr. 26, 1927 |
| 1,702,145 | Wilson | Feb. 12, 1929 |
| 1,985,663 | Lowery | Dec. 25, 1934 |
| 2,045,909 | Haralson | June 30, 1936 |
| 2,057,234 | Gorman | Oct. 13, 1936 |
| 2,089,741 | Gaines | Aug. 10, 1937 |
| 2,169,561 | Layne | Aug. 15, 1939 |
| 2,210,751 | Cronkhite | Aug. 6, 1940 |

FOREIGN PATENTS

| Number | Country | Date |
| --- | --- | --- |
| 390,851 | France | Aug. 10, 1908 |